(12) United States Patent
Chen et al.

(10) Patent No.: US 7,956,898 B2
(45) Date of Patent: Jun. 7, 2011

(54) DIGITAL IMAGE STABILIZATION METHOD

(75) Inventors: Homer H. Chen, Taipei (TW); Chia-kai Liang, Taipei (TW); David Yeh, Taipei (TW); Brian Sung, Taipei (TW)

(73) Assignee: National Taiwan University, Taipei (TW)

( * ) Notice: Subject to any disclaimer, the term of this patent is extended or adjusted under 35 U.S.C. 154(b) by 449 days.

(21) Appl. No.: 12/078,491

(22) Filed: Apr. 1, 2008

(65) Prior Publication Data

US 2009/0096878 A1    Apr. 16, 2009

(30) Foreign Application Priority Data

Oct. 12, 2007   (TW) ................ 96138189 A

(51) Int. Cl.
*H04N 5/228* (2006.01)
(52) U.S. Cl. .................................. 348/208.6
(58) Field of Classification Search ............... 348/208.6
See application file for complete search history.

(56) References Cited

U.S. PATENT DOCUMENTS

| | | | |
|---|---|---|---|
| 5,430,479 A | 7/1995 | Takahama et al. | |
| 6,342,918 B1 | 1/2002 | Inou et al. | |
| 6,628,711 B1 | 9/2003 | Mathew et al. | |
| 6,734,901 B1 | 5/2004 | Kudo et al. | |
| 6,781,623 B1 | 8/2004 | Thomas | |
| 7,010,045 B2 * | 3/2006 | Lee | 375/240.25 |
| 7,346,226 B2 * | 3/2008 | Shyshkin | 382/275 |

OTHER PUBLICATIONS

Homer H. Chen, et al., Integration of Digital Stabilizer with Video Codec for Digital Video Cameras, IEEE Transactions on Circuits and Systems for Video Technology, vol. 17, No. 7, Jul. 2007, pp. 801-813.

* cited by examiner

*Primary Examiner* — James M Hannett
(74) *Attorney, Agent, or Firm* — Rosenberg, Klein & Lee

(57) ABSTRACT

A digital image stabilization method that integrates a digital stabilization device and a digital video encoder is disclosed. The digital stabilization device comprises a determining module for determining background regions, a comparison module for calculating motion vectors, and an adjustment module for adjusting jerky image motion in frames. When there are frame jiggles, the motion vector between an I frame and a P frame is used for motion estimation to get a first motion vector and also define a background region of the P frame. Next, a second motion vector of a B frame is calculated according to the background region to adjust jerky motion of the P frame and the B frame for stabilization. The next P frame then uses the background region of the preceding P frame as its background region.

7 Claims, 3 Drawing Sheets

DIGITAL IMAGE STABILIZATION METHOD

BACKGROUND OF THE INVENTION

1. Field of the Invention

The present invention relates to a digital image stabilization technique and, more particularly, to a digital image stabilization method that integrates a digital image stabilization algorithm and a digital video coding system and makes use of motion vectors generated through motion estimation in the digital video coding system for stabilization.

2. Description of Related Art

With the development of multimedia technology, digital still cameras and camera phones are utilized by more and more consumers. Compact, portable and multifunctional digital products are critical features in order to ensure success in the market. Although consumers desire miniaturized multimedia products, they also demand pictures of high quality. Digital cameras and cellular phone cameras, however, easily take poor quality pictures due to shaking or slight hand movement which produces annoying jerky image motion.

Both the digital video coding system and the digital stabilization algorithm need to make motion estimation to determine the motion vector of each frame. In processing digital video coding and stabilization, when one frame enters the system, the motion vector is first calculated to achieve the object of stabilization. Next, the frame is compressed. Because both stabilization and compression are required for each frame, various steps are performed to extract the motion information from the video signal in order to calculate the motion vector of frame. The amount of computation thus is relatively large.

In "digital image stabilization method and device" of Taiwan Publication No. I272550 disclosed on Feb. 1, 2007, a digital stabilization algorithm and a digital video coding system are integrated. Frames with jerky image motion in an image sequence are compensated, and the processing of I frames and P frames is emphasized. As shown in FIG. 1, after the $I_0$ frame is compressed, the motion vector of the whole frame is obtained. The background region $BR_0$ in the $I_0$ frame is compared, and this motion vector is used to adjust the $P_1$ frame for stabilization. Making use of this image processing method, when a frame enters, it is not necessary to calculate the motion vector of the whole frame. Instead, the motion vector of the preceding frame obtained during compression is used to estimate the motion vector of the current frame. This method, however, can only be applied to the processing of the I frame and P frame.

The present invention discloses a digital image stabilization method of B frames to remove unwanted motion in the image sequence while preserving intentional camera movement so as to solve the above problems in the prior art.

SUMMARY OF THE INVENTION

An object of the present invention is to provide a digital image stabilization method, in which a motion vector calculated from a P frame is sent to a preceding or a subsequent B frame so that the B frame can use this motion vector for stabilization. The motion vector calculated from the P frame is also sent to the next P frame.

Another object of the present invention is to provide a digital image stabilization method, in which data obtained after stabilization of the B frame is not sent to other frames because the amount of computation of the B frame itself is large.

Yet another object of the present invention is to provide a digital image stabilization method, which is applicable when the GOP structure is IBBP.

To achieve the above objects, the present invention provides a digital image stabilization method, which integrates a digital video encoder and a digital stabilization device together to form an integrated system, and calculates the motion vector of at least one frame in an image sequence to remove at least one block of the frame with jerky image motion. The method comprises the steps of: (a) a comparison module in the digital video encoder comparing one I frame and one P frame to get a first motion vector when there are frame jiggles; (b) a determination module using the first motion vector to define a background region of the P frame, and the digital video encoder compressing the I frame; (c) calculating a second motion vector of at least one B frame before or after the P frame according to the background region, and using the second motion vector to define a background region of the B frame to adjust jerky image motion; and (d) repeating Step (c) to calculate the background regions of a plurality of subsequent P frames and B frames. Each of the subsequent P frames uses the background region of the preceding P frame as its background region. All the frames are not compressed one by one. Instead, by first skipping B frames, this method processes P frames and then jumps back to process B frames. This method has a higher probability of accurate estimation, and the compression efficiency is also better.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

The present invention provides a digital image stabilization method, which integrates a digital video encoder and a digital stabilization device and calculates the motion vector in an image sequence so as to remove or adjust blocks in frames with jerky image motion.

Figure 1:
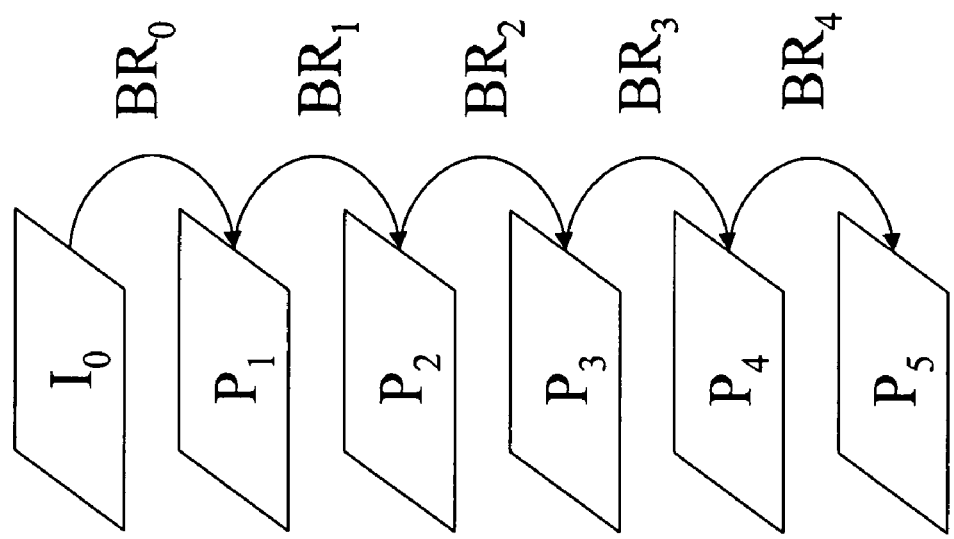
FIG. 1 is a diagram showing the assignment of background region (BR) by comparing the I frame and P frame in the prior art.
Figure 2:
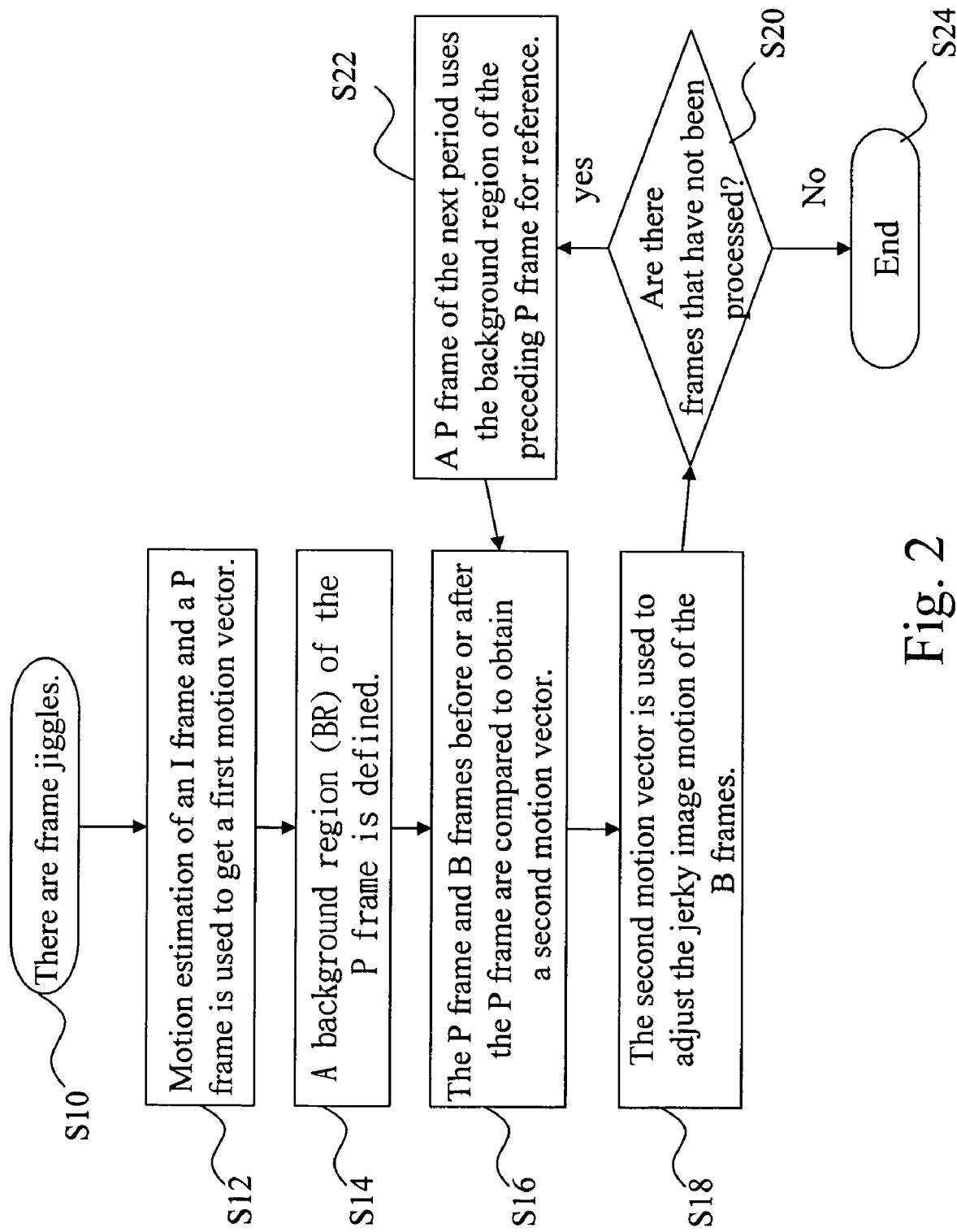
FIG. 2 is a flowchart illustrating a digital image stabilization method according to an embodiment of the present invention.

Refer to FIG. 2, which is a flowchart of the digital image stabilization method of the present invention. When there are unintentional image movement in frames (Step S10), a comparison module in the digital stabilization device compares an I frame with the next frame (P frame) according to motion estimation between the I frame and the P frame to get a first motion vector (Step S12). A determination module uses the first motion vector to define a background region (BR) of the P frame, and the digital video encoder then compresses the I frame (Step S14). In Step S16, the background region of the P frame is provided for B frames before or after the P frame, and second motion vectors are calculated after comparing the P frame and the B frames. The second motion vectors are then used to adjust the B frames for adjusting jerky image motion (Step S18). Whether or not there are frames that have not been processed yet is then determined (Step S20). If the answer is yes, the next P frame (i.e., the P frame in the next cycle) uses the background region of the preceding P frame for reference for adjusting jerky image movement, and Steps S17~S20 are repeated to calculate motion vectors and background regions of subsequent P frames and B frames (Step S22). When all frames have been adjusted, the process flow ends (Step S24).

There are 1 to 5 B frames in each cycle and the number of B frames in each cycle is the same. When there are more than one B frames in each cycle the B frames are processed in the same order as they arrive to the digital video encoder. After the B frames have been adjusted (i.e., after the B frames have been stabilized), they are directly compressed, and data obtained during adjustment is not sent to other frames to save on the amount of computation.

In Step S12, after the comparison module first compares an I frame and a P frame to calculate the first motion vector, the digital video encoder compresses the I frame. In Step S16, compression of the P frame is performed after the second motion vector between a P frame and a B frame and both the B frame and the next P frame use the background region of the P frame for stabilization.

Figure 3:
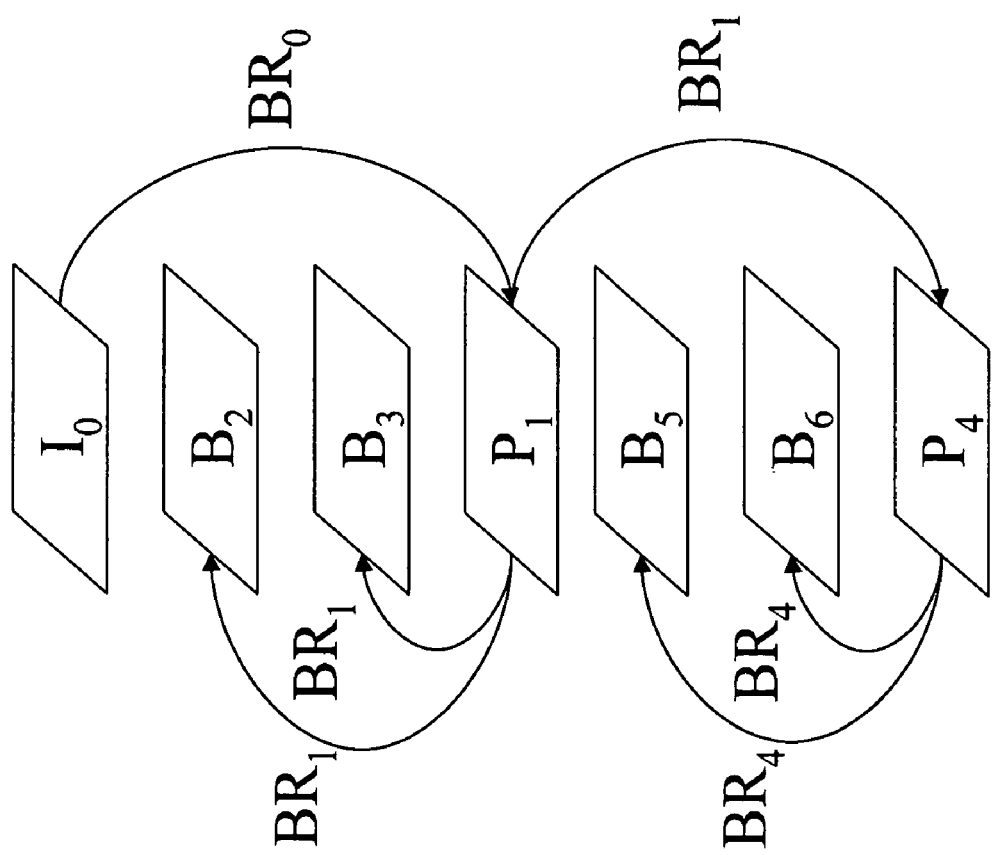
FIG. 3 is a diagram showing the assignment of background region (BR) in the digital image stabilization method according to an embodiment of the present invention.

As can be seen from above, after the background region is determined, the digital stabilization device uses all blocks in the background region of the next frame to make motion estimation (i.e., block-based motion estimation, BME). Refer to FIG. 3, which is a diagram showing the assignment of background region (BR) in the digital image stabilization method of the present invention. Assume there are two B frames in each cycle. First, the zero-th frame $I_0$ and the frame $P_1$ are compared to get a first motion vector. The first motion vector then is used to define the block of a background region $BR_0$ of $P_1$. Next, the background region $BR_0$ of the frame $P_1$ is provided for frames $B_2$ and $B_3$, and the frames $P_1$ and $B_2$ are compared to determine a second motion vector, which is used to adjust a background region $BR_1$ of the frames $B_2$ and $B_3$. For frames of the next cycle, the background region of frame P ($P_4$) is obtained from that of the P frame of the preceding period ($P_1$). That is, the background region of the frame $P_4$ is $BR_1$, and the background region $BR_1$ is used for stabilization of the frame $P_4$. The comparison of the frame $P_4$ with frames $B_5$ and $B_6$ is the same as that of the frame $P_1$ with the frames $B_2$ and $B_3$, and the defined background region is used to adjust the two frames $B_5$ and $B_6$. The rest may be deduced by analogy if there still are frames of subsequent cycles.

The processing of the first cycle differs from that of subsequent cycles in that the background region of the first P frame is obtained before compression. In subsequent P frames, the background region provided by the preceding P frame is used for stabilization, and the updated background region is used for compression. All the above motion vectors are used for stabilization, and it is necessary to separately calculate compressed motion vectors because the frames have been calibrated during compression. In other words, the motion vectors need to be calculated afresh to be correct.

The present invention applies to GOP structure of IBBP format. All the frames are not compressed one after one. By first skipping B frames, this method processes P frames and then jumps back to process B frames. This method has a higher probability of correct estimation, and the compression efficiency is also better. Moreover, because only blocks of a specific background region in a frame need to be compared instead of the whole frame, it is not necessary to store the whole frame. Therefore, memory space can be saved, and the computational speed can be relatively accelerated, hence shortening the time required for frame adjustment and reducing the computation time for stabilization. Furthermore, the background region of each frame is determined from the motion vector provided by the digital video encoder instead of using a fixed region for background prediction. Therefore, the present invention is able to adapt to the scene even if the background is moving.

The digital image stabilization method provided in the present invention first determines a block in a background region $BR_n$ in the n-th frame, and then compares this block with a corresponding block in the (n-1)-th frame to get a motion vector so as to adjust the n-th frame for compensating the induced frame jiggles. In the present invention, the first P frame is compared with the I frame, and subsequent P frames refer to P frames of the preceding cycle. Stabilization information of B frames is obtained from P frames. Because the amount of computation of B frames themselves is very large their computation information is not sent to other frames after the adjustment of jerky image motion and the compression of B frames. This reduces the amount of computation, enhance the compression efficiency, and also shorten the computation time.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A digital image stabilization method that integrates a digital video encoder and a digital stabilization device together to form an integrated system, said method calculating motion vectors of an image sequence, said method comprising the steps of:
   (a) a comparison module in said digital video encoder comparing one I frame and one P frame or one P frame and another P frame to generate a first motion vector based on the compared image frames;
   (b) a determination module using said first motion vector to define a background region of said P frame;
   (c) calculating a second motion vector of at least one B frame before or after said P frame for said background region based on the compared image frames, and using said second motion vector to adjust said jerky B frame; and
   (d) repeating Steps (b) and (c) to calculate said background regions of a plurality of subsequent P frames and B frames;
   wherein each of said subsequent P frames uses a background region of the preceding P frame as the background region thereof.

2. The method as claimed in claim 1, wherein said B frame is encoded after adjusting said B frame in said Step (c).

3. A digital image stabilization method that integrates a digital video encoder and a digital stabilization device together to form an integrated system, said method calculating motion vectors of an image sequence, said method comprising the steps of:
   (a) a comparison module in said digital video encoder comparing one I frame and one P frame or one P frame and another P frame to get a first motion vector;
   (b) a determination module using said first motion vector to define a background region of said P frame;

(c) calculating a second motion vector of at least one B frame before or after said P frame for said background region, and using said second motion vector to adjust said jerky B frame; and,
(d) repeating Steps (b) and (c) to calculate said background regions of a plurality of subsequent P frames and B frames;
wherein each of said subsequent P frames uses a background region of the preceding P frame as the background region thereof; and,
wherein when the number of said B frames in each cycle is multiple, said B frames are processed in same order as they arrive at said digital video encoder.

4. The method as claimed in claim 1, wherein said background region is a region with right-angle corners.

5. The method as claimed in claim 1, wherein said background region contains at least one block.

6. The method as claimed in claim 1, wherein said first motion vector is estimated according to motion between said I frame and said P frame or said two P frames.

7. The method as claimed in claim 1, wherein said digital video encoder compresses said I frame after said first motion is generated.

* * * * *